United States Patent
Scott et al.

(10) Patent No.: US 7,349,756 B2
(45) Date of Patent: Mar. 25, 2008

(54) METHOD FOR CONTROL OF YARN PROCESSING EQUIPMENT

(75) Inventors: Gregory James Scott, Hockessin, DE (US); Joseph Anthony Perrotto, Landenberg, PA (US); Glen Edward Simmonds, Avondale, PA (US); Richard Davis Bryson, Elkton, MD (US); William Robert Corcoran, Kennett Square, PA (US); William Charles Walker, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 289 days.

(21) Appl. No.: 10/530,932

(22) PCT Filed: Dec. 12, 2003

(86) PCT No.: PCT/US03/40020

§ 371 (c)(1),
(2), (4) Date: Apr. 11, 2005

(87) PCT Pub. No.: WO2004/059051

PCT Pub. Date: Jul. 15, 2004

(65) Prior Publication Data

US 2006/0009873 A1    Jan. 12, 2006

Related U.S. Application Data

(60) Provisional application No. 60/434,051, filed on Dec. 17, 2002.

(51) Int. Cl.
*G06F 19/00* (2006.01)
(52) U.S. Cl. .................. 700/144; 700/142; 19/0.3; 19/0.35; 19/0.39
(58) Field of Classification Search ............... 700/130, 700/139, 142, 144; 19/0.3, 0.35, 0.39; 57/264, 57/310, 315
See application file for complete search history.

(56) References Cited

U.S. PATENT DOCUMENTS

| | | | | | |
|---|---|---|---|---|---|
| 2,569,957 | A | * | 10/1951 | Schneider | 19/0.6 |
| 3,469,285 | A | * | 9/1969 | Garrison et al. | 19/0.37 |
| 3,596,458 | A | * | 8/1971 | Nakano et al. | 57/2 |
| 3,624,996 | A | * | 12/1971 | Shepherd et al. | 57/408 |
| 3,789,461 | A | * | 2/1974 | Nakano et al. | 19/0.35 |
| 3,878,178 | A | * | 4/1975 | Guinn et al. | 526/240 |
| 3,913,176 | A | * | 10/1975 | Grossi | 19/0.35 |
| 3,953,161 | A | * | 4/1976 | Oguchi et al. | 425/66 |

(Continued)

FOREIGN PATENT DOCUMENTS

WO    WO 0077283    12/2000

(Continued)

*Primary Examiner*—Gary L. Welch
*Assistant Examiner*—Nathan E Durham (57) ABSTRACT

A method for starting or stopping each of at least two separately controllable roll-sets (22, 26, 34, 56) used for processing a yarn (Y) in a stretch-break process, each roll-set comrprising at least two rolls, the method is characterized by the step of each roll-set, changing the speed of each roll from an initial condition to a steady state condition in accordance with a predetermined sequence and in coordination with a change in speed of at least one of the other rolls, such that simultaneous complete breakage of a yarn (Y) being processed in a stretch-break process is minimized.

24 Claims, 5 Drawing Sheets

U.S. PATENT DOCUMENTS

| | | | |
|---|---|---|---|
| 4,000,960 A * | 1/1977 | Oguchi et al. | 425/76 |
| 4,080,656 A * | 3/1978 | Jonsson et al. | 700/144 |
| 4,080,778 A * | 3/1978 | Adams et al. | 57/2 |
| 4,118,921 A * | 10/1978 | Adams et al. | 57/200 |
| 4,195,051 A * | 3/1980 | Frankfort et al. | 264/211.14 |
| 4,265,082 A * | 5/1981 | Sasaki et al. | 57/207 |
| 4,461,740 A * | 7/1984 | Koschinek et al. | 264/210.8 |
| 4,477,526 A * | 10/1984 | Lauterbach | 428/399 |
| 4,500,278 A * | 2/1985 | Cochran et al. | 425/445 |
| 4,501,710 A * | 2/1985 | Abbott et al. | 264/40.1 |
| 4,505,100 A * | 3/1985 | Yoshiyuki et al. | 57/207 |
| 4,547,933 A * | 10/1985 | Lauterbach | 19/0.35 |
| 4,583,266 A * | 4/1986 | Tango et al. | 19/0.37 |
| 4,698,956 A * | 10/1987 | Clarke et al. | 57/2 |
| 4,713,931 A * | 12/1987 | Morrison et al. | 57/328 |
| 4,759,985 A * | 7/1988 | Armiger et al. | 428/367 |
| 4,835,956 A * | 6/1989 | Sasaki et al. | 57/245 |
| 4,856,147 A * | 8/1989 | Armiger et al. | 19/0.35 |
| 4,905,355 A * | 3/1990 | Bauer et al. | 28/187 |
| 4,924,556 A * | 5/1990 | Gilhaus | 19/0.35 |
| 5,006,294 A * | 4/1991 | Bice et al. | 264/138 |
| 5,045,388 A * | 9/1991 | Bice et al. | 428/299.1 |
| 5,083,419 A * | 1/1992 | Greifeneder et al. | 57/6 |
| 5,145,623 A * | 9/1992 | Hendrix et al. | 264/103 |
| 5,750,215 A * | 5/1998 | Jaegge et al. | 428/34.2 |
| 5,791,542 A * | 8/1998 | Porat et al. | 226/44 |
| 5,981,006 A * | 11/1999 | Jaegge et al. | 428/34.2 |
| 6,014,104 A | 1/2000 | Imae et al. | |
| 6,477,740 B1 * | 11/2002 | Hansen | 19/0.35 |
| 6,783,851 B2 * | 8/2004 | Crawford et al. | 428/364 |
| 2002/0161470 A1 * | 10/2002 | Kusuzono et al. | 700/142 |
| 2005/0147815 A1 * | 7/2005 | Perrotto et al. | 428/364 |

FOREIGN PATENT DOCUMENTS

WO      WO 0077283 A2 * 12/2000

* cited by examiner

| Main Parameters | Step | 1 | 2 | 3 | 4 | 5 | 6 |
|---|---|---|---|---|---|---|---|
| Production Take-up Drive | | | | | ON | | |
| Production Take-up | m/min | 0.00 | 0.00 | 0.00 | 207.40 | 312.70 | 312.70 |
| Take-up Tension | % | 0.0 | 0.0 | 0.0 | 0.0 | 0.0 | 0.0 |
| Roll-set 5 | m/min | 0.00 | 0.00 | 0.00 | 207.40 | 312.70 | 312.70 |
| Consolidation Ratio | 1/x | 0 | 0 | 0 | 0.98 | 0.98 | 0.98 |
| Roll-set 4 | m/min | 0.00 | 0.00 | 101.46 | 211.63 | 319.08 | 319.08 |
| Re-Break Ratio | 1/x | 0 | 0.00 | 1.83 | 2.33 | 2.82 | 2.82 |
| Roll-set 3 | m/min | 0.00 | 0.00 | 55.44 | 90.83 | 113.15 | 113.15 |
| Stretch Break Ratio | 1/x | 0.00 | 20.00 | 2.20 | 2.93 | 3.65 | 3.65 |
| Roll-set 2 | m/min | 16.80 | 0.00 | 25.20 | 31.00 | 31.00 | 31.00 |
| Draw Ratio | 1/x | 2.10 | 2.50 | 2.80 | 3.10 | 3.10 | 3.10 |
| Roll-set 1 | m/min | 8.0 | 8.0 | 9.0 | 10.0 | 10.0 | 10.0 |
| Aspirator Jet | | Off | Off | On | On | On | On |
| Consolidation Jet | | Off | Off | Off | On | On | On |
| Waste Jet | | Off | Off | Off | Off | Off | Off |
| Winder | | Off | Off | Off | Off | Off | On |

FIG. 4

METHOD FOR CONTROL OF YARN PROCESSING EQUIPMENT

This application claims priority as a Section 371 application of International Application PCT/US03/40,020, filed Dec. 12, 2003, which itself claims benefit of application 60/434,051, filed Dec. 17, 2002.

FIELD OF THE INVENTION

The present invention relates to control of yarn processing equipment in a stretch-break process and in particular to a method for starting the process in a coordinated manner.

BACKGROUND

The textile industry utilizes multi-positional commercial spinning machines capable of winding multiple spindles of identical product. One type of commercial yarn producing machine, known as a ring spinning machine, directly produces a staple yarn. The production throughput of such a machine is relatively limited.

Figure 1:
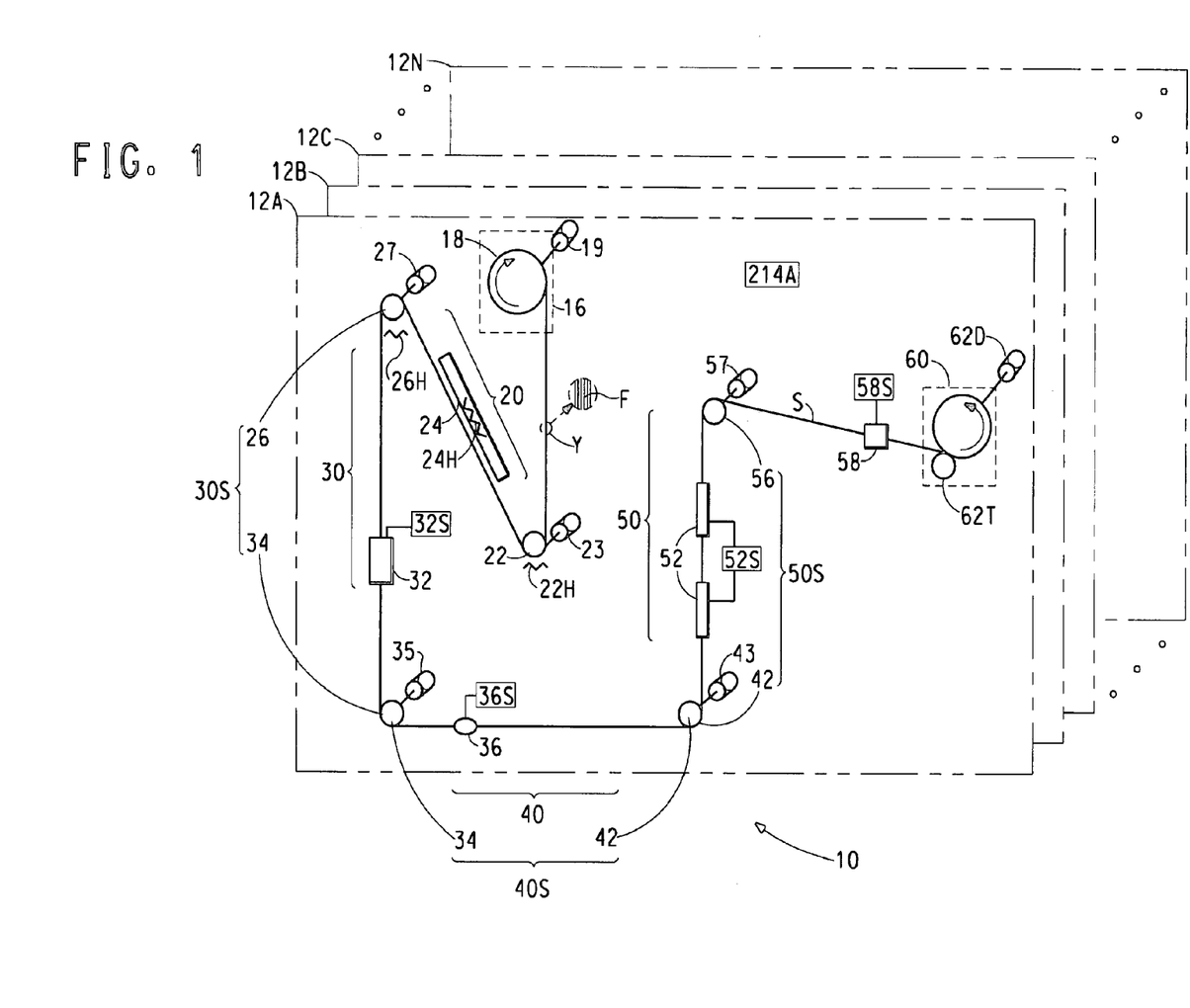

Another direct spinning apparatus, which for the purpose of this application is referred to as a "stretch-break" apparatus, improves throughput by producing staple yarn directly from a multi-filament yarn feed in a continuous operation. Shown within the dotted box in FIG. 1 is a schematic view of the functional and enabling elements of a single position 12A of a stretch-break apparatus generally represented by reference character 10. One or more additional stretch-break positions 12B, 12C, . . . 12N, each identical to position 12A, may be provided to define a multi-position apparatus 10. The apparatus 10 is disclosed and claimed in co-pending application Ser. No. 09/979,808, published internationally on Dec. 21, 2000 as WO 0077283.

Throughout the following description of the stretch-break apparatus it should be appreciated that each roll in a position may be implemented as multiple rolls, with or without associated nip rolls. It should also be understood that the pressure exerted by the nip rolls may be controlled, either manually or by an associated control device.

The position 12A includes a drawing and annealing zone 20, a first break zone 30, a second break zone 40 (also known as a re-break zone), and a consolidation zone 50 connected in series between a continuous supply 16 of yarn Y and a windup zone 60.

The yarn supply 16 may include an unwinder 18 driven by enabling unwind controller 19, as shown, or another suitable yarn supply device. The unwind controller 19 may be implemented by a braking mechanism or an unwind motor to control the tension of the yarn Y fed from the unwinder 18.

The drawing and annealing zone 20 is defined between a roll 22 and a driven roll 26 and includes a hot plate 24. The roll 22 includes an enabling heater 22H and the hot plate 24 includes an enabling heating element 24H. The roll 26 may also include an enabling heater 26H. As is well known, to impart draw action, driven roll 26 must rotate at a higher surface speed than the surface speed of the heated roll 22. The ratio of the surface speed of roll 26 to the surface speed of roll 22 is termed "draw ratio".

The first break zone 30 is defined between rolls 26 and 34, and the second break zone 40 is defined between rolls 34 and 42. The ratio of the surface speed of roll 34 to the surface speed of roll 26 is termed "stretch-break ratio", while the ratio of the surface speed of roll 42 to the surface speed of roll 34 is termed "re-break ratio". An optional jet 32 with enabling air supply 32S may be included in the first break zone 30. The second break zone 40 may include an optional jet 36 with an associated enabling air supply 36S.

The consolidation zone 50 is defined between rolls 42 and 56 and may include one or more consolidation jets 52 and its enabling air supply 52S. The consolidation device may also be a mechanical or other fluid device designed to consolidate the yarn Y. The ratio of the surface speed of roll 56 to the surface speed of roll 42 is termed "consolidation ratio".

The windup zone 60 includes a traversing winder 62 for collecting the finished staple yarn S on a bobbin B. The winder 62 has an associated enabling winder and traverse drives 62D, 62T. A waste jet 58 and it enabling-air supply 58S may directly precede the winder 62 to facilitate stringing. The ratio of the surface speed of winder 62 to the surface speed of roll 56 is termed "Take Up Tension" (in the table of FIG. 4).

Individual rolls that sequentially contact the yarn Y during the stretch-break process may be paired into operational roll-sets. Thus, rolls 26, 34 may define a first roll-set 30S, rolls 34, 42 may define a second roll-set 40S, and rolls 42, 56 may define a third roll-set 50S. Each roll 22, 26, 34, 42, and 56 has an associated enabling drive motor 23, 27, 35, 43, and 57 respectively.

Figure 1A:
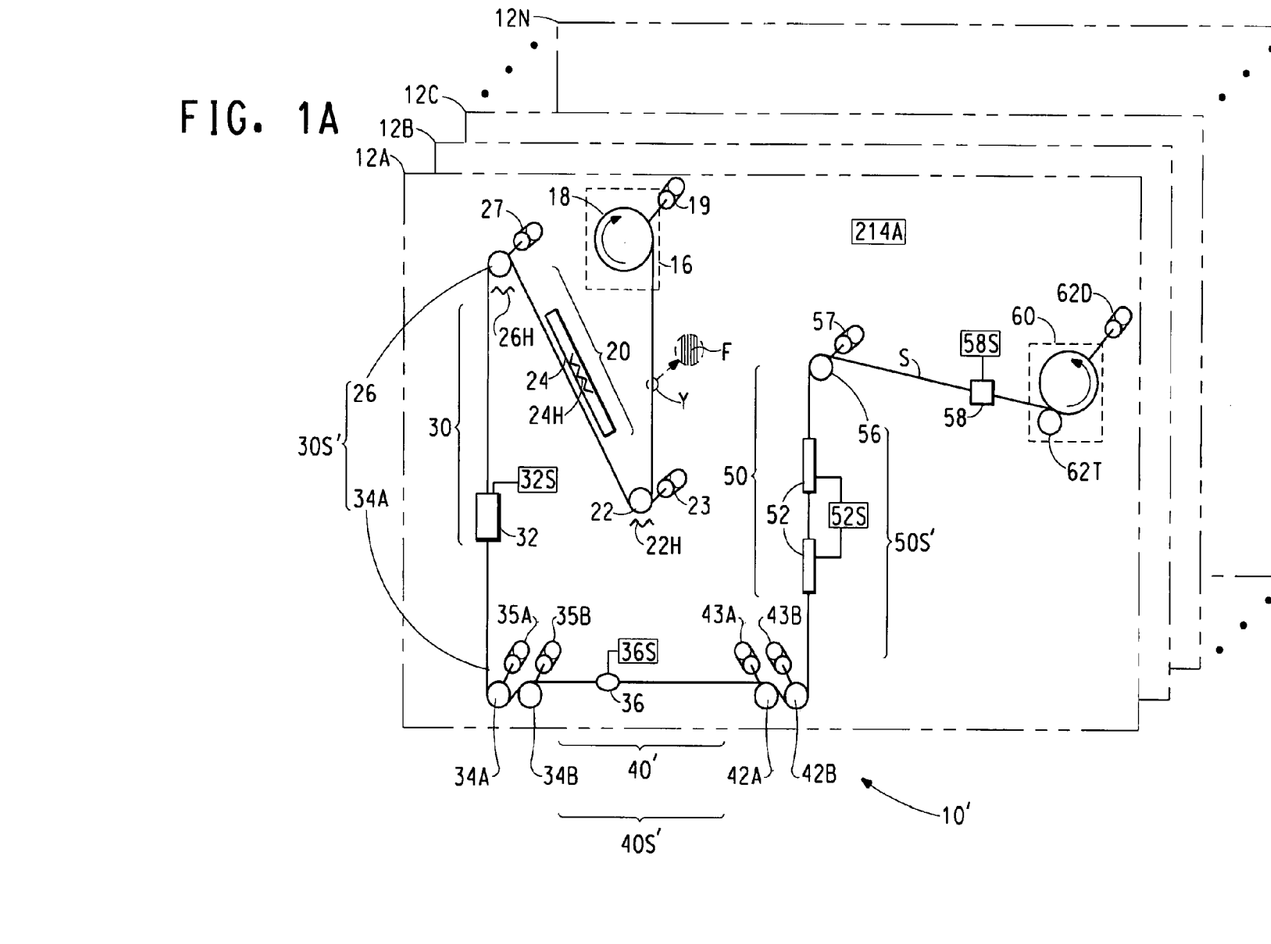
FIG. 1A is a schematic view of a modification thereof.

Alternatively, as seen in FIG. 1A, the roll 34 may be functionally implemented by multiple rolls, such as dual rolls 34A, 34B. Similarly, roll 42 may be functionally implemented by multiple rolls, such as dual rolls 42A, 42B. In such an alternative configuration rolls 26, 34A; rolls 34B, 42A; and rolls 42B, 56 may define operational roll-sets 30S', 40S', 50S', respectively. Rolls 34A, 34B, 42A, and 42B have associated drive motors 35A, 35B, 43A, and 43B respectively.

In operation, yarn Y comprised of filaments F is introduced into the drawing and annealing zone 20. Within the drawing and annealing zone 20 the yarn Y is heated to an annealing temperature by the combination of the heater 22H within the heated roll 22 and the hot plate 24. The first roll 22 in the drawing and annealing zone 20 grips the incoming filaments F and the second roll in the operational roll-set (i.e., roll 26) draw-stretches the same. The surface speed of roll 26 may be set relative to the surface speed of roll 22 to draw the heated yarn Y, if desired, to obtain desired tensile properties.

The annealed yarn Y passes into the first break zone 30. During steady state operation, the first roll 26 in the break zone 30 grips the annealed filaments and the second roll in the operational roll-set, i.e., roll 34 (FIG. 1) or roll 34A (FIG. 1A), as the case may be, draw-stretches them until all of the filaments F break in a random manner. The filaments F may be further broken in the second break zone 40 located downstream from the first break zone 30. An optional jet 36 may be used to control ends of filaments broken in the first break zone to prevent roll wraps.

The yarn Y is then consolidated in the consolidation zone 50 to form a staple yarn S. The staple yarn S is wound on the bobbin B under controlled tension and traverse speed by the winder 62.

The stretch-break process as implemented in the apparatus 10 is particularly difficult to start, since the dynamic stretching and breaking properties of a yarn differ at various speeds and differ from its static properties. The goal of the stretch-break process is to break all of the filaments randomly in both time and location. In the apparatus of FIG. 1 all the filaments are broken randomly in the first stretch-break zone 30, and those broken filaments are re-broken randomly in the second re-break zone 40. Aggressive starting could result in simultaneous complete breakage of all filaments in either zone, resulting in loss of string-up of the yarn through the apparatus and generation of waste product.

Startup is particularly complicated by the interaction of process parameters. For instance, the stretch-break tolerance (i.e., the breakage of some filaments without complete breakage) of the yarn is affected by the annealing temperature, which changes throughout startup. The stretch-break tolerance of the yarn also changes significantly as roll speeds, and the relative speed ratio of rolls in a given roll-set, vary throughout startup. Jet parameters, particularly operating pressure, affect the degree of fiber entanglement, and winding parameters, such as winding tension, also affect the yarn's stretch-break tolerance.

In view of the foregoing is believed to be beneficial to provide a computer-implemented method for controlling the transition from an initial to a steady state condition of a single or multi-position stretch-break process that minimizes the possibility of complete yarn breakage and waste. It is believed of further advantage to be able to control the process parameters in accordance with a predetermined "recipe" tailored to each individual yarn. As used herein the term "recipe" is a predetermined sequence of changes of operational parameters for the various enabling elements in each position of the stretch-break apparatus. For example, a given recipe will specify sequential changes in the speed of each roll in coordination with the change in speed of at least one other roll (i.e., the ratio of speeds in a given roll-set), the temperature of each heater or heated roll, the operating parameter (i.e., pressure state) of associated jet(s), and the winder tension, to cause a processing position to transition from a stopped or initial condition to a steady state operating condition. The transitions of parameters may be varied in a step-wise or continuous manner.

SUMMARY OF THE INVENTION

This invention comprises a computer-implemented method and program for starting each of at least three separately controllable roll-sets used for processing a yarn Y in a stretch-break process. Each roll-set comprises at least two rolls. Under the method of the present invention, for each roll-set, the speed of each roll is changed from an initial condition to a steady state condition in accordance with a predetermined sequence and in coordination with a change in speed of at least one of the other rolls, such that complete breakage of a yarn Y being processed in a stretch-break process is minimized.

The start up sequence of the method may be practiced in two manners. In the first manner the speed of each roll is changed in at least two discrete steps to achieve a steady state set of roll speeds. In the second the speed of each roll is continuously changed to the steady state roll speeds.

The predetermined sequence is created by the steps of:
a) selecting a candidate speed for each roll;
b) validating the candidate speed for each roll against predetermined operability criteria; and
c) for speeds that meet the operability criteria, setting the speed for each roll.

BRIEF DESCRIPTION OF THE FIGURES

The invention may be more fully understood from the following detailed description taken in connection with the accompanying drawings, which form a part of this application, and in which:

FIG. 1 is a schematic view of one position within a multi-position stretch-break apparatus of the prior art while

DETAILED DESCRIPTION

Throughout the following detailed description similar reference characters refer to similar elements in all figures of the drawings.

Figure 2:
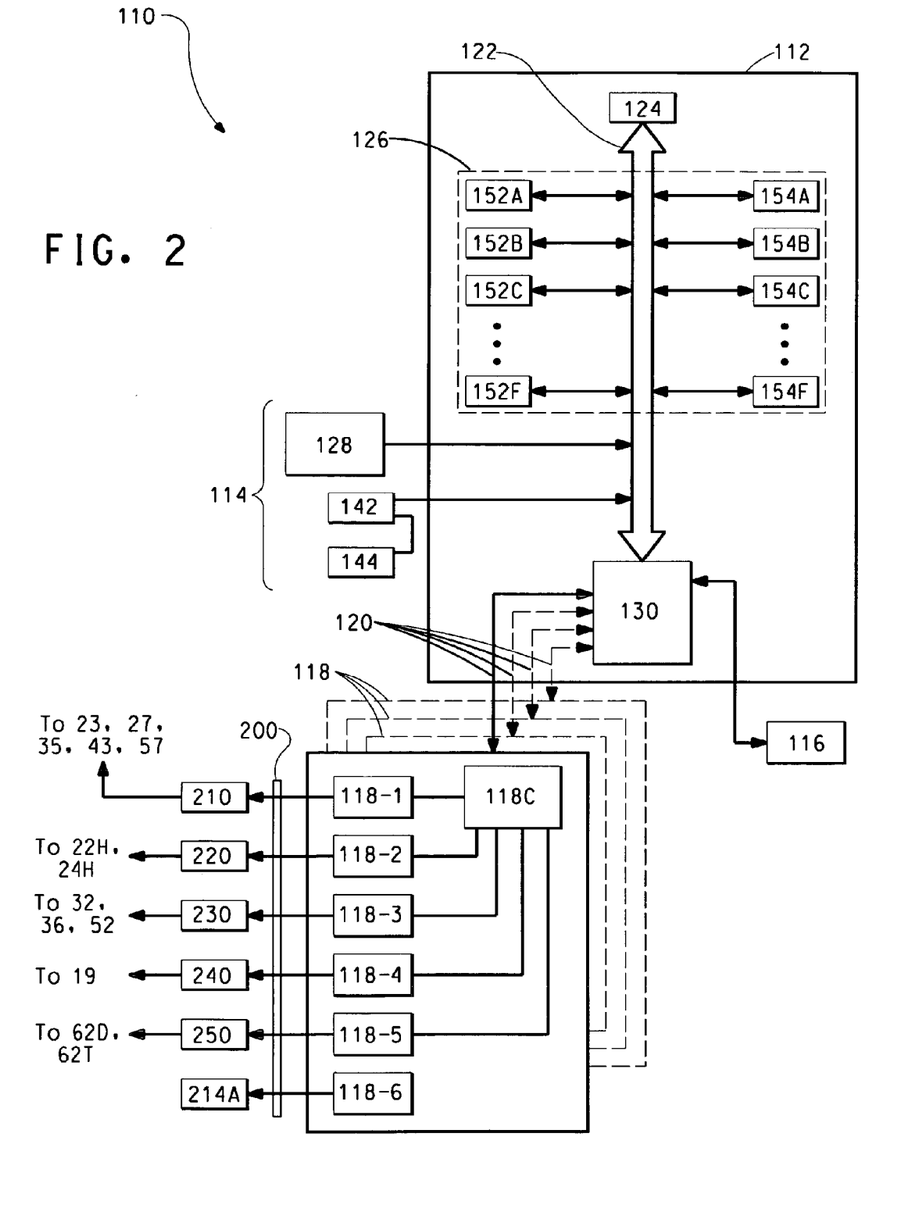
FIG. 2 is a detailed block diagram of a computer system and associated controller for executing a program in accordance with the method of the present invention to control each position.

FIG. 2 is a detailed block diagram of a control system 110 comprising a computer 112 and associated controller(s) 118 for executing a program in accordance with the method of the present invention to control each position 12A through 12N of the multi-position stretch-break apparatus 10 in accordance with a predetermined recipe. The control system 110 may be implemented using a standard desk-top personal computer 112 and one or more commercially available Programmable Logic Controllers (PLCs) 118.

Figure 3:
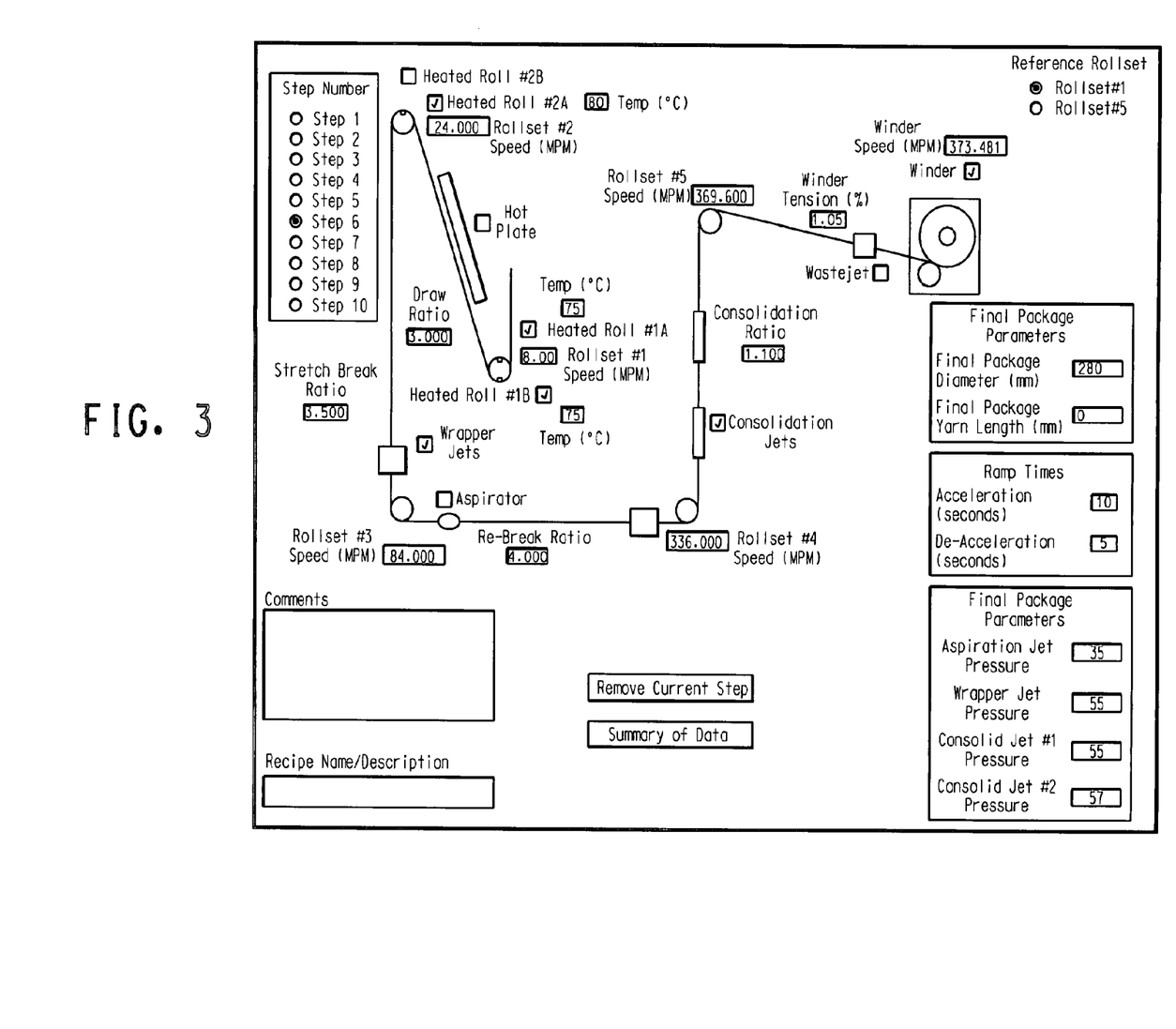
FIG. 3 is an example of a screen display generated by the graphical user interface of the computer system of FIG. 2.

The computer 112 comprises a central processing unit (CPU) 124, a memory 126, an operator display 128, a keyboard 142 and mouse 144 for operator input, an input-output interface 130 and an associated storage device 116 connected by a data and control bus 122. The memory 126 may be implemented as random access memory (RAM) or another suitable memory device and may be partitioned into memory units 152A, 152B, . . . 152F. The operator display 128 includes a cathode ray tube (CRT), a Liquid Crystal Display (LCD) or some other device for displaying a graphical user interface 114 whereby an operator communicates with the computer 112 using the keyboard 142 and the mouse 144. A visual graphic, generated by the graphical user interface 114, for a single position is shown in FIG. 3.

Suitable cable assemblies 120 implement a bus network to connect the computer 112 with each controller 118 using any standard bus protocol. Controllers 118 each comprise a central control unit 118C and associated input-output (I/O) interfaces 118-1, 118-2, 118-3, 118-4, 118-5. Each I/O interface is in turn connected by cable assemblies 200 to the control devices 210-250. Each control device 210-250 is associated with respective enabling elements for a single position 12A-12N.

As shown, I/O interface 118-1 is connected to a motor inverter unit 210, in turn connected to drive motors 23, 27, 35, 43, 57. The I/O interface 118-2 is connected to heater control 220, which is in turn connected to heaters 22H and 24. I/O interface 118-3 is connected to jet control 230, which is in turn connected to jets 32, 36, 52, 54, and 58. I/O interface 118-4 is connected to yarn supply tension control 240, which is in turn connected to unwind controller 19. I/O interface 118-5 is connected to winder control 250, which is in turn connected to winder drive 62D and winder traverse 62T. It should be appreciated that a multi-channel PLC capable of interfacing the various enabling elements for two or more positions 12A-12N of the apparatus 10 may be employed.

Having described the physical elements and control system architecture, the operation of the method of the present invention that permits each position 12A-12N to be operated independently, using an individual and completely different process recipe which is downloaded to controller 118, may now be discussed.

The present invention stores the commands that implement a process recipe in the computer memory 126. When these commands are executed the control system 110 causes the position to perform either a multi-step sequence or a continuous sequence.

Tables of predetermined operability criteria (i.e., operational limits) for various parameters are stored in the computer memory. An example of an operability criterion is the maximum allowable stretch ratio at a given temperature for a particular type yarn Y. The predetermined operability criteria may be experimentally determined by incrementally changing roll-set speeds and the resulting roll speed ratios to determine operability limits for a given yarn product that will permit achieving the desired steady state running condition.

A recipe for a given yarn product can be developed by the operator. Various candidate parameters for each operating condition are selected. Each candidate parameter is validated against its associated predetermined operability criteria. If the candidate parameter satisfies the operability criteria the parameter is entered into the recipe. If the candidate parameter does not satisfy operability conditions the candidate parameter is denied entry into the recipe. Completed recipes, shown as memory segments 154A-154F may be saved using conventional computer file storage techniques.

Since yarns made of different filaments (i.e., different deniers or different materials) may have completely different physical characteristics, process recipe programming flexibility is critical. Each yarn type or combination of yarn types performs differently in the drawing and annealing, break, re-break, consolidation and windup zones (20-60 of FIG. 1). In a multi-step recipe each step in the recipe incrementally changes the parameters in one of more zones. Each incremental step changes roll speed ratios in a coordinated manner until operational speeds are achieved. In a similar manner, a continuous recipe gradually increases changes roll speed ratios continuously (which may be approximated by incrementing speeds in many very small steps) until operational speeds are achieved.

The method of the present invention may be implemented using the system control device 110 by downloading a recipe from the desktop computer 112 to the controller 118 associated with a given position. The system control device will facilitate a plurality of multi-step or continuously varying process recipes to be written, modified and stored. The operator can select from pre-determined multi-step process recipes stored in the memory 126 (or storage device 116) and download the selected recipe to any one controller 118 associated with a yarn processing position (such as 12A) or group of positions (such as 12A-12C). This download process is a transfer of recipe data from the system computer 112 to a dedicated positional programmable logic controller (PLC) 118, thus freeing the computer 112 for other tasks.

The PLC 118 then controls: the associated motor inverter unit 210 to control drive motors 23, 27, 35, 43, 57; the heater control 220 to control heaters 22H and 24H; the jet control 230 to control jets 32, 36, 52, 54, and 58; the yarn supply tension control 240 to control unwind controller 19; and the winder control 250 to control winder drive 62D and traverse drive 62T.

Once the data is distributed to the selected control device (210-250) associated with a particular position, that position (such as 12A) can operate independent of the system control device 110 and independent of other surrounding positions (such as 12B or 12C). Since each position 12A-12N can potentially operate with a different multi-step process recipe a separate local readout/operator interface 214A-214N (FIG. 1) is provided for each position 12A-12N. This local readout 214 will enable the operator to control a position and monitor all of the unique positional specific data as well as display positional and system fault messages.

It should be noted that recipes are not specific to just motor speeds. Recipes also include operational parameters such as drawing and annealing zone heater temperatures, as well as pressure settings for aspirators, consolidation jets and nip rolls (not shown). Recipes can also include winder-specific parameters such as helix angle, traverse length, package pressure and package length or diameter. Automatic step string-up may also be accommodated in a recipe. This can be done by providing a specified time for each step to operate before automatically. progressing to the next sequential step.

Using the graphical display generated by the user interface 114, shown in FIG. 3, new recipes can be developed. The graphical display has windows associated with various icons that pictorially represent hardware elements. Each window represents an operating parameter of an enabling element for a particular step in a recipe. As may be appreciated by viewing the list in the upper left corner of the display, a recipe of up to ten steps may be accommodated. If the candidate parameter satisfies operability criteria the parameter is entered into the new recipe. If the candidate parameter does not satisfy operability criteria the operator is alerted (such as by a color change or flashing warning) and the candidate parameter is denied entry into the recipe.

Figure 4:
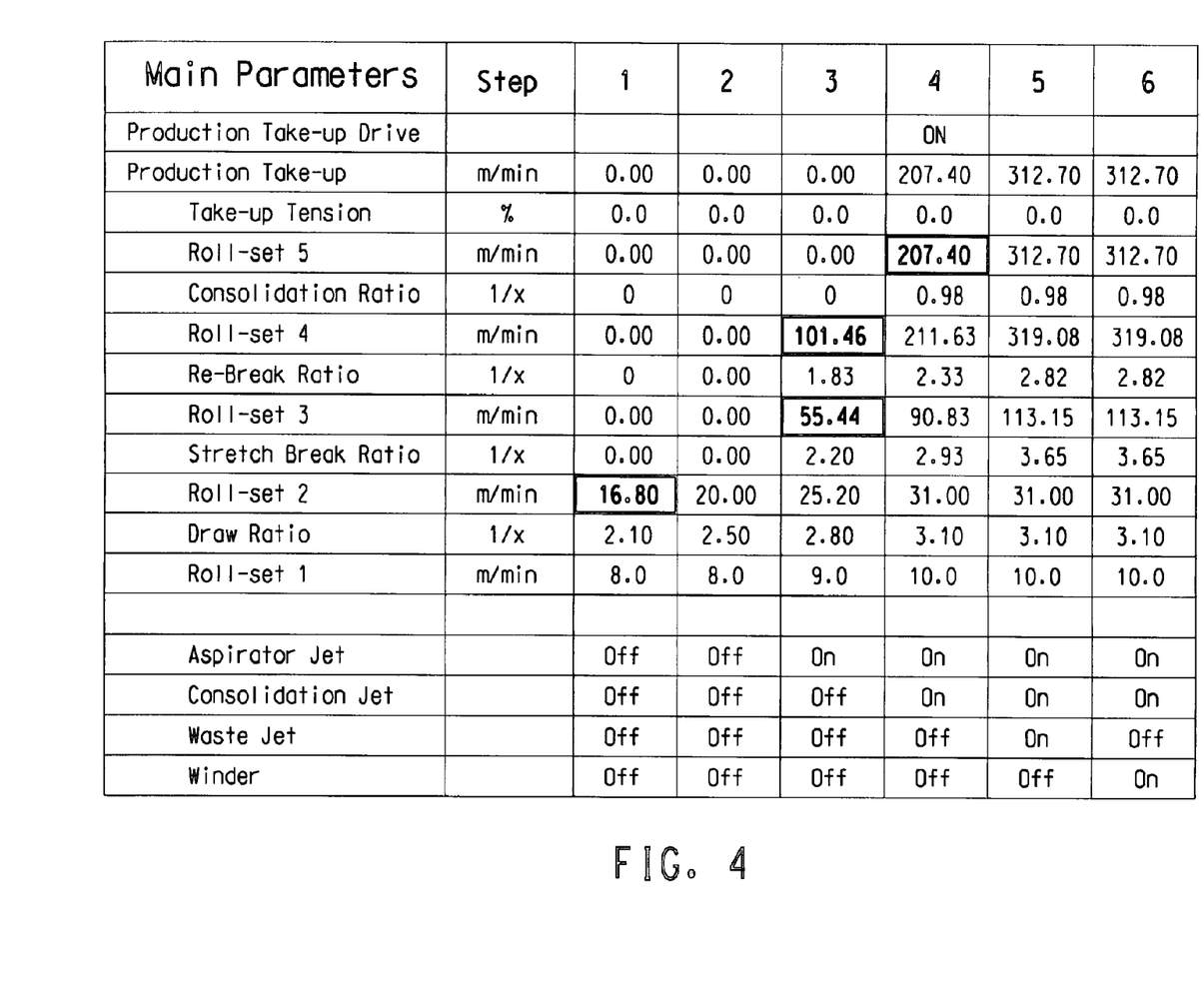
FIG. 4 is a table illustrating an example of a multi-step process recipe in accordance with the present invention.

A multi-step process recipe, shown as steps 1 through 6 in the top row of the table, is tabularized in FIG. 4. The operating parameters are identified in the left column of the table. Each step in the recipe can be created or modified through the use of the graphical interface 114. FIG. 3 shows the operating parameters corresponding to step 6 of the recipe of FIG. 4. Calculated roll speeds are displayed based on recipe and step specific ratios. The roll speed of the next step is coordinated with the previous roll speed by multiplying the previous roll speed by the step specific ratio. Therefore by entering the first roll speed or the last roll speed and all zone ratios, all other associated roll speeds can be calculated using a Reference Rollset Selection routine.

The Reference Roll-set Selection routine allows roll-set speed calculations to be started from roll 1 (heated roll 22 of FIG. 1) forward or from roll 5 (roll-set 56 of FIG. 1) backward. This enables an operator to design a step specific recipe by specifying a number of parameters:

1) specifying a required starting speed, with the other speeds being calculated, or specifying a required ending speed with the other speeds being calculated;

2) specifying either a final yarn package diameter or package length may be entered (If a value is entered into both, the first to be achieved during operation becomes the operative parameter resulting in a package doff);

3) specifying the acceleration and deceleration time, in seconds, which refers to step-specific time for motors to accelerate or decelerate to the next or previous step speed, respectively. The following calculation is required to determine motor frequency acceleration:

$$\text{Frequency Acceleration(Hz/sec)} = (\text{Freq}_{final} - \text{Freq}_{init})/(\text{Accel Time})$$

The precision of this calculation must be at least 0.1% (i.e., $10^{-3}$) since all rolls must accurately achieve their final speeds to maintain the desired ratio. This gradual stepping of process ratios in the drawing and annealing, break, re-break, consolidation and windup zones provides the necessary easing of the feed material to the final process speed. These ratio steps result in a specific recipe that is unique to a specific type yarn Y.

In addition to operability criteria, safety criteria for the specific hardware of each position are stored in a system database. Safety limits, such as maximum motor speeds, are entered as a system management function and their values are stored in the system database. If a calculated roll speed falls above a system safety limit the operator is alerted via a different graphic color change of the specific roll icon. Thus a selected parameter is validated against predetermined safety criteria as well as operability criteria before the parameter is input into a recipe. The zone ratio, or initial speed is then adjusted to achieve a safe roll speed.

A background monitoring routine, resident in the system computer 112, periodically issue data requests to each positional device to ascertain the state of machine operation via the bus network 120. A log file may be created if desired by system computer 112 to record this data. Since the same bus is used to download recipes to positions, monitoring is suspended during a recipe download to maintain the integrity of data. When the recipe download is complete monitoring is resumed.

Those skilled in the art, having benefit of the teachings on the present invention as hereinabove set forth, may effect modifications and extensions thereof. Such modifications and extensions are to be construed as lying within the scope of the present invention as defined by the claims appended hereto.

We claim:

1. A method for starting or stopping each of at least three rolls (26, 34, 42) arranged in at least two separately controllable roll-sets used for processing a yarn (Y) in a stretch-break process, each roll-set comprising at least two of the rolls, the stretch-break process including at least one jet consolidation device (32, 36, 52), the method comprising the steps of:
   a) for each roll-set, changing the speed of each roll from an initial condition to a steady state condition in coordination with a change in speed of at least one of the other rolls in accordance with a predetermined sequence, wherein the predetermined sequence is created by the steps of:
      i) selecting a candidate speed for each of the three rolls;
      ii) validating the candidate speed for each roll against predetermined operability criteria; and
      iii) for speeds that meet the operability criteria, setting the speed for each of the three rolls; and
   b) selecting at least one operating parameter for the jet, wherein the jet operating parameter comprises an operating pressure and wherein the operating pressure is selected in at least two discrete steps,
   such that simultaneous complete breakage of a yarn (Y) being processed in a stretch-break process is minimized.

2. The method of claim 1 wherein the speed of each roll is changed from the initial condition to the steady state condition in at least two discrete steps.

3. The method of claim 1 wherein the speed of each roll is changed from the initial condition to the steady state condition in a continuous manner.

4. The method of claim 1 wherein the initial condition is a stopped condition.

5. The method of claim 1 wherein each roll-set is comprised of each pair of adjacent rolls that sequentially contact the yarn (Y).

6. The method of claim 1 wherein during the stretch-break process a yarn (Y) is annealed, the method further comprising the step of selecting at least one annealing temperature.

7. A method of claim 1 further comprising the step of:
   changing the operating pressure to each of the two pressure steps in coordination with the change in speed of at least one of the rolls.

8. The method of claim 1 wherein the stretch break process includes a winder operable to collect the yarn (Y) under tension on a bobbin, the methods further comprising the step of selecting the tension imposed on the yarn by the winder.

9. The method of claim 1 wherein the candidate operating speed is selected using a graphic display interface, the interface displaying a diagram of the process and having windows for entry of the operating speed.

10. The method of claim 9 where each predetermined operability criterion is compared to each candidate operating speed entry and the results of the comparison is displayed in a visual manner to indicate the speed meeting or exceeding the predetermined operability criterion.

11. The method of claim 1 wherein the candidate operating pressure is selected using a graphic display interface, the interface displaying a diagram of the process and having windows for entry of the operating pressure.

12. The method of claim 11 where each predetermined operability criterion is compared to each candidate operating pressure entry and the result of the comparison is displayed in a visual manner to indicate the pressure meeting the predetermined operability criteria.

13. A method for starting or stopping each of at least three rolls (26, 34, 42) arranged in at least two separately controllable roll-sets used for processing a yarn (Y) in a stretch-break process, each roll-set comprising at least two of the rolls, the stretch-break process including at least one jet consolidation device (32, 36, 52), the method comprising the steps of:
   a) for each roll-set, changing the speed of each roll from an initial condition to a steady state condition in coordination with a change in speed of at least one of the other rolls in accordance with a predetermined sequence, wherein the predetermined sequence is created by the steps of:
      i) selecting a candidate speed for each of the three rolls;
      ii) validating the candidate speed for each roll against predetermined operability criteria; and
      iii) for speeds that meet the operability criteria, setting the speed for each of the three rolls; and
   b) selecting at least one operating parameter for the jet, wherein the jet operating parameter comprises an operating pressure and wherein the operating pressure is selected as a continuous range of pressures,
   such that simultaneous complete breakage of a yarn (Y) being processed in a stretch-break process is minimized.

14. The method of claim 13 wherein the speed of each roll is changed from the initial condition to the steady state condition in at least two discrete steps.

15. The method of claim 13 wherein the speed of each roll is changed from the initial condition to the steady state condition in a continuous manner.

16. The method of claim 13 wherein the initial condition is a stopped condition.

17. The method of claim 13 wherein each roll-set is comprised of each pair of adjacent rolls that sequentially contact the yarn (Y).

18. The method of claim 13 wherein during the stretch-break process a yarn (Y) is annealed, the method further comprising the step of selecting at least one annealing temperature.

19. The method of claim 13 further comprising the step of:
changing the operating pressure through the range in coordination with the change in speed of at least one of the rolls.

20. The method of claim 13 wherein the stretch break process includes a winder operable to collect the yarn (Y) under tension on a bobbin, the method further comprising the step of selecting the tension imposed on the yarn (Y) by the winder.

21. The method of claim 13 wherein the candidate operating speed is selected using a graphic display interface, the interface displaying a diagram of the process and having windows for entry of the operating speed.

22. The method of claim 21 where each predetermined operability criterion is compared to each candidate operating speed entry and the results of the comparison is displayed in a visual manner to indicate the speed meeting or exceeding the predetermined operability criterion.

23. The method of claim 13 wherein the candidate operating pressure is selected using a graphic display interface, the interface displaying a diagram of the process and having windows for entry of the operating pressure.

24. The method of claim 23 where each predetermined operability criterion is compared to each candidate operating pressure entry and the result of the comparison is displayed in a visual manner to indicate the pressure meeting the predetermined operability criterion.

* * * * *